(12) United States Patent
Kilian et al.

(10) Patent No.: US 11,516,703 B2
(45) Date of Patent: Nov. 29, 2022

(54) VARIABLE SUB-PACKET LENGTHS FOR TELEGRAM SPLITTING IN NETWORKS WITH LOW POWER CONSUMPTION

(71) Applicants: Fraunhofer-Gesellschaft zur Foerderung der angewandten Forschung e.V., Munich (DE); Friedrich-Alexander-Universitaet Erlangen-Nuernberg, Erlangen (DE)

(72) Inventors: Gerd Kilian, Erlangen (DE); Josef Bernhard, Erlangen (DE); Joerg Robert, Uttenreuth (DE); Jakob Kneissl, Erlangen (DE); Johannes Wechsler, Erlangen (DE); Stefan Ereth, Erlangen (DE)

(73) Assignees: Fraunhofer-Gesellschaft zur Foerderung der angewandten Forschung e.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 0 days.

(21) Appl. No.: 16/387,417

(22) Filed: Apr. 17, 2019

(65) Prior Publication Data
US 2019/0246315 A1    Aug. 8, 2019

Related U.S. Application Data

(63) Continuation of application No. PCT/EP2017/076585, filed on Oct. 18, 2017.

(30) Foreign Application Priority Data

Oct. 24, 2016    (DE) ..................... 10 2016 220 884.5

(51) Int. Cl.
*H04W 28/06*    (2009.01)
*H04W 52/02*    (2009.01)
(Continued)

(52) U.S. Cl.
CPC ......... *H04W 28/065* (2013.01); *H04L 1/0007* (2013.01); *H04L 1/0041* (2013.01);
(Continued)

(58) Field of Classification Search
None
See application file for complete search history.

(56) References Cited

U.S. PATENT DOCUMENTS

2003/0179882 A1    9/2003  Itano
2004/0120348 A1    6/2004  Chang et al.
(Continued)

FOREIGN PATENT DOCUMENTS

CN    1455557 A    11/2003
CN    105814800 A    7/2016
(Continued)

OTHER PUBLICATIONS

Kilian, Gerd et al., "Improved Coverage for Low-Power Telemetry Systems using Telegram Splitting", Proceedings of 2013 European Conference on Smart Objects, Systems, and Technologies (SmartSysTech), Jun. 11, 2013.
(Continued)

*Primary Examiner* — Shripal K Khajuria
(74) *Attorney, Agent, or Firm* — Perkins Coie LLP; Michael A. Glenn

(57) ABSTRACT

Embodiments provide a transfer method for transferring data of variable length using a fixedly specified number of sub-data packets to which the data of variable length is distributed.

38 Claims, 6 Drawing Sheets

(51) Int. Cl.
*H04L 1/00* (2006.01)
*H04L 69/22* (2022.01)

(52) U.S. Cl.
CPC ......... *H04L 69/22* (2013.01); *H04W 52/0216* (2013.01); *H04W 52/0219* (2013.01); *H04W 52/0229* (2013.01); *Y02D 30/70* (2020.08)

(56) References Cited

U.S. PATENT DOCUMENTS

| | | | |
|---|---|---|---|
| 2006/0105710 | A1 | 5/2006 | Imamura et al. |
| 2009/0303898 | A1* | 12/2009 | Isenmann ............... H04L 12/66 370/252 |
| 2012/0314719 | A1 | 12/2012 | Agiwal et al. |
| 2013/0128876 | A1 | 5/2013 | Kilian et al. |
| 2015/0092545 | A1* | 4/2015 | Katar ..................... H04B 3/546 370/230 |
| 2016/0094269 | A1 | 3/2016 | Seller |
| 2016/0198218 | A1* | 7/2016 | Kwon .................... H04L 69/04 725/131 |
| 2016/0249328 | A1 | 8/2016 | Bernhard et al. |
| 2016/0366649 | A1* | 12/2016 | Bernhard ......... H04W 52/0277 |
| 2018/0367279 | A1 | 12/2018 | Hellge et al. |

FOREIGN PATENT DOCUMENTS

| | | |
|---|---|---|
| DE | 102010031411 A1 | 1/2012 |
| DE | 102011082098 B4 | 3/2013 |
| DE | 102016220886 B3 | 3/2018 |
| DE | 102016220882 A1 | 4/2018 |
| EP | 2914039 A1 | 9/2015 |
| JP | 2004165853 A | 6/2004 |
| JP | 2014517628 A | 7/2014 |
| RU | 2217869 C2 | 11/2003 |
| WO | 2011003070 A1 | 1/2011 |
| WO | 2015094037 A1 | 6/2015 |
| WO | 2015128385 A1 | 9/2015 |
| WO | 2018077770 A2 | 5/2018 |
| WO | 2018077771 A2 | 5/2018 |

OTHER PUBLICATIONS

Kilian, Gerd et al., "Increasing Transmission Reliability for Telemetry Systems Using Telegram Splitting", IEEE Transactions on Communications, vol. 63, No. 3, pp. 949-961, Mar. 2015, Mar. 2015, pp. 949-961.

* cited by examiner

VARIABLE SUB-PACKET LENGTHS FOR TELEGRAM SPLITTING IN NETWORKS WITH LOW POWER CONSUMPTION

CROSS-REFERENCES TO RELATED APPLICATIONS

This application is a continuation of copending International Application No. PCT/EP2017/076585, filed Oct. 18, 2017, which is incorporated herein by reference in its entirety, and additionally claims priority from German Application No. DE 10 2016 220 884.5, filed Oct. 24, 2016, which is incorporated herein by reference in its entirety.

BACKGROUND OF THE INVENTION

Embodiments of the present invention relate to a data transmitter for transmitting data. Further embodiments relate to a data receiver for receiving data. Some embodiments relate to variable sub-packet lengths for telegram splitting in networks with low power consumption.

DE 10 2011 082 098 B4 describes a method for battery-operated transmitters, wherein the data packet is divided into transmission packets that are smaller than the actual information to be transmitted (so-called telegram splitting). Telegrams are distributed to several sub-packets. Such a sub-packet is referred to as hop. Several information symbols are transferred in a hop. The hops are transmitted on one frequency or distributed across several frequencies, the so-called frequency hopping. Between the hops, there are pauses in which transmission does not takes place.

In a typical sensor network, several 100,000 sensor nodes are covered with only one base station. Since the sensor nodes only comprise very small batteries, a coordination of the transfers is hardly possible in most cases. By means of the telegram splitting method, a very high transfer reliability is achieved for this.

WO 2015/128385 A1 describes a data transmission arrangement comprising an energy harvesting element and an energy source. The data transmission arrangement is configured to transmit data using the telegram splitting method, wherein a sub-packet to be transmitted is either transmitted, buffered and transmitted at a later time, or discarded depending on an amount of electrical energy provided by the energy supply unit.

The publication [G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013] describes an improved range for low-energy telemetry systems that use the telegram splitting method.

The publication [G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015] describes improved transfer reliability for low energy telemetry systems that use the telegram splitting method.

US 2016/0094269 A1 describes a wireless communication system with a plurality of base stations and a plurality of end points. The communication systems uses telegrams with a CSS-modulated preamble (CSS=Chirp Spread Spectrum) followed by data, wherein the data is modulated with a lower bandwidth than the preamble.

SUMMARY

An embodiment may have a data transmitter for transmitting data of variable length, wherein the data transmitter is configured to distribute the data of variable length to a specified number of sub-data packets and to transmit the sub-data packets; wherein the data of variable length has payload data; wherein a number of symbols of the individual sub-data packets depends on a length of the data of variable length.

Another embodiment may have a data receiver for receiving data of variable length, wherein the data receiver is configured to receive a specified number of sub-data packets to which the data of variable length is distributed; wherein the data of variable length has payload data; wherein a number of symbols of the individual sub-data packets depends on a length of the data of variable length.

According to another embodiment, a system may have: an inventive data transmitter; and an inventive data receiver.

According to another embodiment, a method for transmitting data of variable length may have the steps of: distributing the data of variable length to a specified number of sub-data packets; and transmitting the sub-data packets within a specified time interval; wherein the data of variable length has payload data; wherein a number of symbols of the individual sub-data packets depends on a length of the data of variable length.

According to another embodiment, a method for receiving data of variable length may have the steps of: receiving a specified number of sub-data packets within a specified time interval, to which the data of variable length is distributed; wherein the data of variable length has payload data; wherein a number of symbols of the individual sub-data packets depends on a length of the data of variable length.

Another embodiment may have a non-transitory digital storage medium having a computer program stored thereon to perform the method for transmitting data of variable length having the steps of: distributing the data of variable length to a specified number of sub-data packets; and transmitting the sub-data packets within a specified time interval; wherein the data of variable length has payload data; wherein a number of symbols of the individual sub-data packets depends on a length of the data of variable length, when said computer program is run by a computer.

Another embodiment may have a non-transitory digital storage medium having a computer program stored thereon to perform the method for receiving data of variable length having the steps of: receiving a specified number of sub-data packets within a specified time interval, to which the data of variable length is distributed; wherein the data of variable length has payload data; wherein a number of symbols of the individual sub-data packets depends on a length of the data of variable length, when said computer program is run by a computer.

Embodiments provide a data transmitter for transmitting data of variable length, wherein the data transmitter is configured to distribute the data of variable length to a specified number of sub-data packets and to transmit the sub-data packets.

Embodiments provide a data receiver for receiving data of variable length, wherein the data receiver is configured to receive a specified number of sub-data packets to which the data of variable length is distributed. Due to the fact that the data of variable length is distributed to the same number of sub-data packets regardless of its length, an involved overhead may be kept low, since no additional synchronization sequences have to be transferred in additional data packets, for example. Furthermore, a transfer time may be kept short so that the probability of an interference of the transfer may further be kept low.

In embodiments, the data of variable length is distributed to a specified number of sub-data packets (regardless of their length). Accordingly, the lengths of the individual sub-data packets depend on the length of the data of variable length.

Further embodiments provide a method for transmitting data of variable length, wherein the method includes a step of distributing the data of variable length to a specified number of sub-data packets, and a step of transmitting the sub-data packets.

Further embodiments provide a method for receiving data of variable length, wherein the method includes a step of receiving a specified number of sub-data packets to which the data of variable length is distributed, and a step of combining the specified number of sub-data packets in order to obtain the data of variable length.

Further embodiments provide a transfer method for transferring data of variable length using a fixedly specified number of sub-data packets to which the data of variable length is distributed.

In the following, embodiments of the data transmitter for transmitting data of variable length are described.

In embodiments, the specified number of sub-data packets may be a fixedly specified (or invariable) number of sub-data packets. The data transmitter may be configured to distribute the data of variable length to the same number of sub-data packets (regardless of its length). Accordingly, the lengths of the individual sub-data packets may depend on the length of the data of variable length.

In embodiments, the data transmitter may be configured to transmit the sub-data packets within a specified temporal interval.

For example, the data of variable length may be transmitted using the specified number of sub-data packets regardless of a length of the data of variable length ( ) within the specified temporal interval.

In embodiments, the data transmitter may be configured to transmit the sub-data packets temporally spaced apart from each other so that there are transmission pauses between the sub-data packets.

In embodiments, the data transmitter may be configured to transmit the sub-data packets with a specified temporal interval, so that the temporal interval between the sub-data packets remains constant regardless of a length of the data of variable length.

For example, the pauses (transmission pauses) between the sub-data packets may remain constant if the lengths of the sub-data packets (sub-packet lengths) change (depending on the length of the data of variable length) For example, three sub-data packets may comprise a length of 24 symbols each, the pauses being 10 ms and 15 ms. If the lengths of the sub-data packets increase due to a length of the data of variable length and result in, e.g., 34 symbols per sub-data packet, the pauses still amount to 10 ms and 15 ms.

In embodiments, the data transmitter may be configured to transmit the sub-data packets with a temporal interval depending on the length of the data of variable length so that a temporal interval between specified regions (e.g. start of the sub-data packet start, center of the sub-data packet, end of the sub-data packet or a (partial-)synchronization sequence) of the sub-data packets remains constant regardless of a length of the data of variable length.

For example, the sub-data packets may be transmitted such that a distance between the specified regions (e.g. start of the sub-data packet start, center of the sub-data packet, end of the sub-data packet or a (partial-)synchronization sequence) remains constant. For example, three sub-data packets may comprise a length of 24 symbols each, the pauses being 10 ms and 15 ms. If the lengths of the sub-data packets increase due to a length of the data of variable length and result in, e.g., 34 symbols per sub-data packet, the pauses are shorter, e.g. 5 ms and 10 ms.

In embodiments, the data transmitter may be configured to provide at least a part of the sub-data packets with synchronization sequences.

In embodiments, the data transmitter may be configured to provide at least a part of the sub-data packets with sub-synchronization sequences. In this case, the data transmitter may be configured to divide a synchronization sequence into the sub-synchronization sequences.

The synchronization sequences or sub-synchronization sequences may be positioned at any location in the sub-data packet. For a possibly following iterative decoding, it is of advantage that the synchronization sequences or sub-synchronization sequences are transmitted together with the data in one sub-data packet. Obviously, it is also possible to distribute the synchronization sequences or sub-synchronization sequences and the data to separate sub-data packets (hops). In this case, it is advantageous to ensure that the coherence is not lost between the data hops and sync hops.

For example, the sub-data packets may be provided with synchronization sequences or partial synchronization sequences. If the sub-data packets are provided with synchronization sequences, a full synchronization of the respective sub-data packet and/or a detection or localization of the same in a reception data stream is possible on the receiver side based on the respective synchronization sequence. If the sub-data packets are provided with partial synchronization sequences, a full synchronization of the sub-data packets and/or a detection of the same in a receive data stream is (only) possible on the receiver side across several or all partial synchronization sequences into which the synchronization sequence is divided.

In embodiments, the data transmitter may be configured to transmit the sub-data packets with a temporal distance depending on the length of the data of variable length so that a temporal distance between the synchronization sequences or sub-synchronization sequences of the sub-data packets is constant regardless of a length of the data of variable length.

For example, the sub-data packets may be transmitted in such a way that a temporal distance between the synchronization sequences or sub-synchronization sequences is constant.

In embodiments, the data may include core data and extension data, wherein the core data comprises a fixed length and the extension data comprises a variable length. The data transmitter may be configured to provide the core data with signaling information for signaling the length of the extension data.

The data transmitter may be configured to distribute the core data and the extension data to the sub-data packets.

For example, the data transmitter may be configured to distribute the core data in such a way to the sub-data packets that, in the sub-data packets, the respective part of the core data is arranged adjacent to the (sub-)synchronization sequences. The data transmitter may be configured to distribute the core data to the sub-data packets in such a way that, in the sub-data packets, the respective part of the core data is arranged evenly in front of and behind the respective (sub-)synchronization sequences.

For example, the data transmitter may be configured to distribute the extension data in such a way to the sub-data packets that, in the sub-data packets, the respective part of the extension data is arranged adjacent to the respective part of the core data. The data transmitter may be configured to distribute the extension data in such a way to the sub-data packets that, in the sub-data packets, the respective part of the extension data is arranged evenly in front of and behind the respective part of the core data.

For example, the data transmitter may be configured to distribute the core data to the sub-data packets depending on lengths of the synchronization sequences or sub-synchronization sequences so that sub-data packets having longer synchronization sequences or sub-synchronization sequences contain a larger part of core data than sub-data packets having shorter synchronization sequences or sub-synchronization sequences. In other words, the core data is distributed according to the length of the respective preamble length, i.e. if there are more preamble symbols in a sub-data packet, more core data symbols may be attached therein than in a sub-data packet containing fewer preamble symbols. The data transmitter may be configured to distribute the extension data to the sub-data packets depending on lengths of the synchronization sequences or sub-synchronization sequences so that sub-data packets having longer synchronization sequences or sub-synchronization sequences contain a larger part of extension data than sub-data packets having shorter synchronization sequences or sub-synchronization sequences.

In embodiments, the data transmitter may be configured to divide the number of sub-data packets into at least two independent blocks of sub-data packets, wherein the data transmitter is configured to divide the sub-data packets in such a way into the at least two blocks of sub-data packets that a first block of the at least two blocks of sub-data packets may be individually detected on the receiver side.

In this case, the data transmitter may be configured to provide at least one of the two blocks of sub-data packets with a synchronization sequence for synchronizing the sub-data packets in a data receiver. Furthermore, the data transmitter may be configured to provide the first block of sub-data packets with information about a second block of sub-data packets of the at least two blocks of sub-data packets. For example, the information may signal at least one of a length, a number of sub-data packets and a hopping pattern with which the sub-data packets are transmitted. For example, the position of the further blocks may be known or may be signaled in the first block. With this, the further blocks do not necessarily have to be detectable.

In embodiments, the data transmitter may be configured to distribute the data of variable length to at least one additional sub-data packet if a length of the data of variable length is large enough that, when transmitting the sub-data packets within the specified time interval, a minimum value of the transmission pauses between the sub-data packets would not be reached. In this case, the data transmitter may be configured to provide the data contained in the sub-data packets of a fixed number with information about the at least one additional sub-data packet.

In the following, embodiments of the data receiver for receiving data of variable length are described.

In embodiments, the specified number of sub-data packets may be a fixedly specified (or invariable) number of sub-data packets. For example, the data of variable length may be distributed to the same number of sub-data packets (regardless of a length of the same). Accordingly, the lengths of the individual sub-data packets may depend on the length of the data of variable length.

In embodiments, the data receiver may be configured to receive the sub-data packets within a specified time interval.

In embodiments, the sub-data packets may be temporally spaced apart from each other so that there are pauses between the sub-data packets.

In embodiments, the transmission pauses between the sub-data packets may be constant regardless of a length of the data of variable length.

For example, the pauses (transmission pauses) between the sub-data packets may remain constant if the lengths of the sub-data packets (sub-packet lengths) change (depending on the length of the data of variable length). For example, three sub-data packets may comprise a length of 24 symbols each, the pauses being 10 ms and 15 ms. If the lengths of the sub-data packets increase due to a length of the data of variable length and, e.g., result in 34 symbols per sub-data packet, the pauses still amount to 10 ms and 15 ms.

In embodiments, the transmission pauses between the sub-data packets may depend on the length of the data variable length such that a temporal distance between specified regions (e.g. start of a sub-data packet, center of a sub-data packet, end of a sub-data packet or a (partial) synchronization sequence) of the sub-data packets is constant regardless of a length of the data of variable length.

For example, the sub-data packets may be transmitted in such a way that a distance between the specified regions (e.g. start of a sub-data packet, center of a sub-data packet, end of a sub-data packet or a (partial) synchronization sequence) is constant. For example, three sub-data packets may comprise a length of 24 symbols, the pauses being 10 ms and 15 ms. If the lengths of the sub-data packets increase due to a length of the data of variable length and, e.g., amount to 34 symbols per sub-data packet, the pauses are shorter, e.g., 5 ms and 10 ms.

In embodiments, at least a part of the sub-data packets may be provided with synchronization sequences, wherein the data receiver may be configured to detect the sub-data packets based on the synchronization sequences.

In embodiments, at least a part of the sub-data packets may be provided with synchronization sequences, wherein the data receiver may be configured to detect the sub-data packets based on the synchronization sequences.

For example, the sub-data packets may be provided with synchronization sequences or partial synchronization sequences. If the sub-data packets are provided with synchronization sequences, a full synchronization of the respective sub-data packet and/or a detection of the same in a reception data stream is possible on the receiver side based on the respective synchronization sequence. If the sub-data packets are provided with partial synchronization sequences, a full synchronization of the sub-data packets and/or a detection or localization of the same in a receive data stream is (only) possible on the receiver side across several or all partial synchronization sequences into which the synchronization sequence is divided.

In embodiments, the temporal distance between the synchronization sequences or sub-synchronization sequences may be constant regardless of a length of the data of variable length and/or may be known to the data receiver.

In embodiments, the data of variable length may include core data and extension data, wherein the core data comprises a fixed length and the extension data comprises a variable length.

The core data may be provided with signaling information for signaling the length of the extension data, wherein the data receiver may be configured to receive the extension data using the signaling information, or to extract the same from the sub-data packets.

The core data and the extension data may be distributed to the sub-data packets.

For example, the core data may be distributed in such a way to the sub-data packets that, in the sub-data packets, the respective part of the core data is arranged adjacent to the sub-synchronization sequences. For example, the core data may be distributed in such a way to the sub-data packets that, in the sub-data packets, the respective part of the core data is evenly arranged in front of and behind the respective synchronization sequence or sub-synchronization sequence.

For example, the extension data may be distributed to the sub-data packets in such a way that, in the sub-data packets, the respective part of the extension data is arranged adjacent to the respective part of the core data. For example, the extension data may be distributed to the sub-data packets in such a way that, in the sub-data packets, the respective part of the extension data is arranged evenly in front of and behind the respective part of the core data.

The core data may be distributed to the sub-data packets depending on lengths of the synchronization sequence or the sub-synchronization sequence so that sub-data packets having a longer synchronizations sequence or sub-synchronization sequence contain a larger part of core data than sub-data packets having a shorter synchronization sequence or sub-synchronization sequence. In this case, the data receiver may be configured to determine lengths of the parts of core data contained in the respective sub-data packets on the basis of the lengths of the synchronization sequence or sub-synchronization sequence contained in the respective sub-data packets.

The extension data may be distributed to the sub-data packets depending on lengths of the synchronization sequence or sub-synchronization sequence so that sub-data packets having a longer synchronization sequence or sub-synchronization sequence contain a larger part of extension data than sub-data packets having a shorter synchronization sequence or sub-synchronization sequence. In this case, the data receiver may be configured to determine lengths of the parts of extension data contained in the respective sub-data packets on the basis of the lengths of the (sub-)synchronization sequence contained in the respective sub-data packets.

In embodiments, the data receiver may be configured to decode and to re-encode a first region of the respective part of the data of variable length using the synchronization sequence or sub-synchronization sequence in order to obtain a first partial region of re-encoded data; to decode a second region of the respective part of the data of variable length using the first partial region of re-encoded data in order to obtain a second partial region of re-encoded data; and to decode a third region of the respective part of the data of variable length using the second partial region of re-encoded data.

In this case, in the respective sub-data packets, the first region may be arranged immediately adjacent to the synchronization sequence or sub-synchronization sequence, and the second region may be arranged immediately adjacent to the first region.

In embodiments, the number of sub-data packets may be divided into at least two independent blocks of sub-data packets so that a first block of the at least two blocks of sub-data packets may be individually detected. The data receiver may be configured to detect the first block of the at least two blocks of sub-data packets individually.

At least one of the at least two blocks of sub-data packets (e.g., the first block of the at least two blocks) may be provided with a synchronization sequence for synchronizing the sub-data packets in a data receiver. The data receiver may be configured to detect the at least one of the at least two blocks of sub-data packets using the respective synchronization sequence.

The first block of sub-data packets of the at least two blocks of sub-data packets may be provided with information about a second block of the at least two blocks of sub-data packets. The data receiver may be configured to receive the second block of the at least two blocks of sub-data packets by using the information. For example, the information may include at least one of a length, a number of sub-data packets and a hopping pattern with which the sub-data packets are transmitted.

In embodiments, the data receiver may be configured to receive at least one further sub-data packet that is attached to the number of sub-data packets.

In embodiments, the data included in the sub-data packets of a fixed number may be provided with information about the at least one additional sub-data packet, wherein the data receiver may be configured to receive the at least one additional sub-data packet by using the information.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
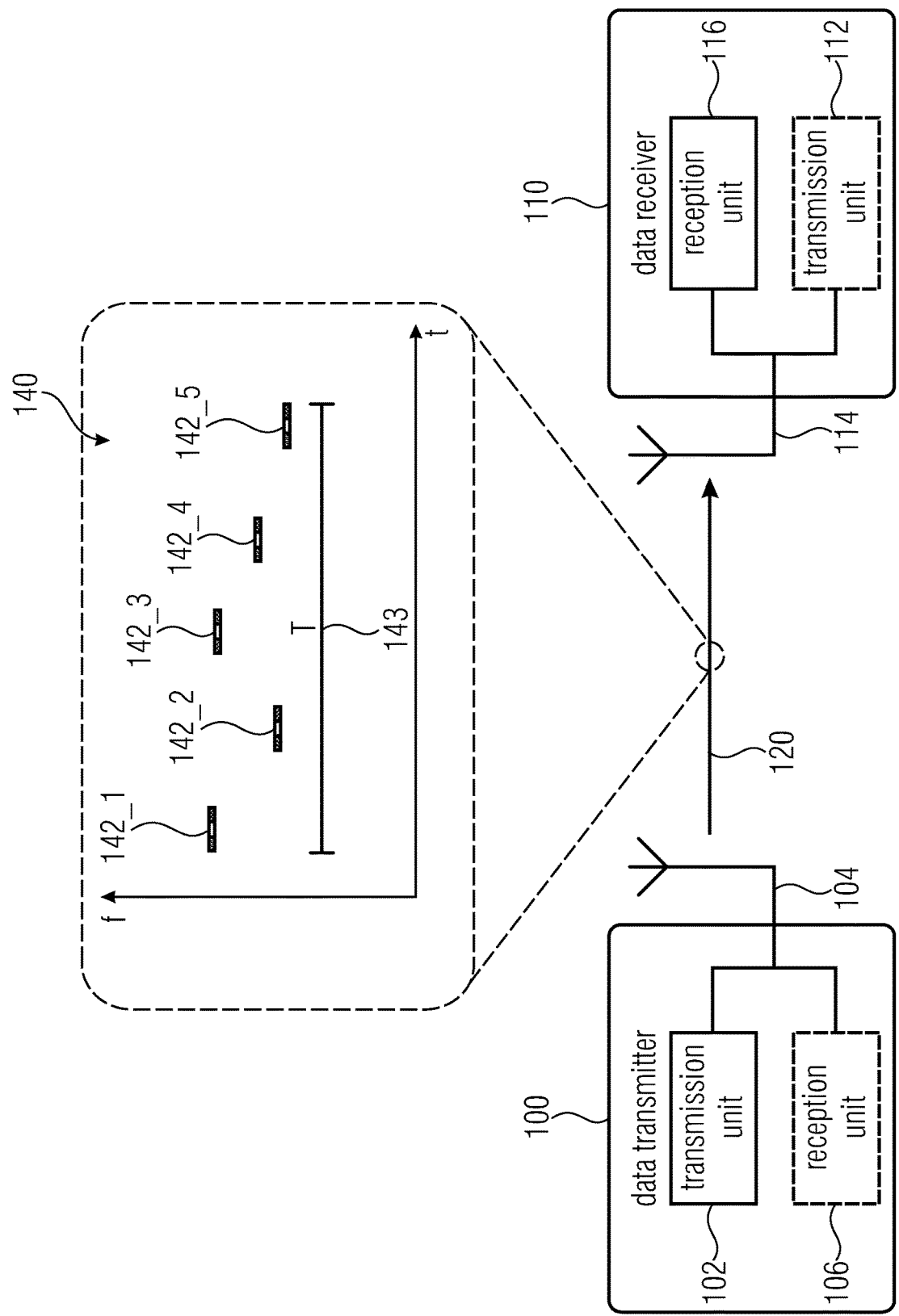
FIG. 1 shows a schematic block circuit diagram of a system with a data transmitter and a data receiver according to an embodiment of the present invention.

In the subsequent description of the embodiments of the present invention, same elements or elements with the same effects are provided with the same reference numerals in the figures so that their description in the different embodiments is interchangeable.

FIG. 1 shows a system with a data transmitter 100 and a data receiver 110 according to an embodiment of the present invention.

The data transmitter 100 is configured to distribute data 120 of variable length to a specified number of sub-data packets 142_1 to 142_n and to transmit the specified number of data packets 142_1 to 142_n.

The data receiver 110 is configured to receive the specified number of sub-data packets 142_1 to 142_n to which the data 120 of variable length is distributed. The data receiver 110 may further be configured to combine the received sub-data packets 142_1 to 142_n or to combine at least a part of the received sub-data packets 142_1 to 142_n depending on a used channel coding, in order to obtain the data 120 of variable length.

In embodiments, the specified number of sub-data packets 142_1 to 142_n may be a fixedly specified (or invariable) number of sub-data packets, i.e. n being a natural number larger than or equal to two, n being invariable. The data transmitter may therefore be configured to distribute the data of variable length (regardless of a length of the same) to the same number n of sub-data packets 142_1 to 142_n. Accordingly, the lengths of the individual sub-data packets 142_1 to 142_n may depend on the length of the data 120 of variable length.

As can exemplarily be seen in FIG. 1, the data 120 of variable length may be distributed to n=5 sub-data packets 142_1 to 142_5 regardless of its length.

In embodiments, the sub-data packets 142_1 to 142_n may be transferred within a fixedly specified (or invariable) time interval 143. Furthermore, the sub-data packets 142_1 to 142_n may be transferred with a temporal distance so that there are transmission pauses between the sub-data packets 142_1 to 142_n. Since the lengths of the individual sub-data packets 142_1 to 142_n depend on the length of the data 120 of variable length and since the data is transferred within the fixedly specified time interval 143, the transmission pauses between the sub-data packets 142_1 to 142_n also depend on the length of the data 120 of variable length.

In embodiments, the sub-data packets may be transferred using a time hopping pattern and/or frequency hopping pattern 140.

In embodiments, the frequency hopping pattern 140 may indicate a sequence of transmission frequencies or transmission frequency hops with which the sub-data packets 142_1 to 142_n are to be transmitted.

For example, a first sub-data packet 142_1 may be transmitted with a first transmission frequency (or in a first frequency channel) and a second sub-data packet 142_2 may be transmitted with a second transmission frequency (or in a second frequency channel), wherein the first transmission frequency and the second transmission frequency differ from each other.

The frequency hopping pattern may define (or specify or indicate) the first transmission frequency and the second transmission frequency. Alternatively, the frequency hopping pattern may indicate the first transmission frequency and a frequency distance (transmission frequency hop) between the first transmission frequency and the second transmission frequency. Obviously, the frequency hopping pattern may also only indicate the frequency distance (transmission frequency hop) between the first transmission frequency and the second transmission frequency.

In embodiments, the transmission frequency pattern may indicate a sequence of transmission times or transmission time distances with which the sub-data packets 142_1 to 142_n are to be transmitted.

For example, a first sub-data packet 142_1 may be transmitted at a first transmission time (or in a first transmission time slot) and a second sub-data packet 142_2 may be transmitted at a second transmission time (or in a second transmission time slot), wherein the first transmission time and the second transmission time are different. The time hopping pattern may define (or specify or indicate) the first transmission time and the second transmission time. Alternatively, the time hopping pattern may indicate the first transmission time and a temporal distance between the first transmission time and the second transmission time. Obviously, the time hopping pattern may also only indicate the temporal distance between the first time and the second transmission time.

A time/frequency hopping pattern 140 may be a combination of a frequency hopping pattern and a time hopping pattern, i.e. a sequence of transmission times or transmission time distances with which the sub-data packets 142_1 to 142_n are transferred, wherein transmission frequencies (or transmission frequency hops) are assigned to the transmission times (or transmission time distances).

In other words, the data transmitter 100 may be configured to transmit the data 120 of variable length by using the telegram splitting method. In this case, the data of variable length 120 may be a telegram, wherein the data transmitter 100 may be configured to divide the telegram into the fixedly specified number of sub-data packets 142_1 to 142_n (or data sub-packets or partial data packets), wherein each of the plurality of sub-data packets is shorter than the telegram.

The plurality of sub-data packets may be transmitted using the frequency hopping pattern and/or time hopping pattern. For example, through the frequency hopping pattern and/or time hopping pattern, each of the plurality of sub-data packets is assigned a transmission frequency (or a transmission frequency hop with respect to a previous data packet) and/or a transmission time (or a transmission time interval, or transmission time slot, or a transmission time hop with respect to a previous sub-data packet)). In addition, the plurality of sub-data packets 142_1 to 142_n may be transmitted with a temporal distance so that there are transmission pauses between the sub-data packets 142_1 to 142_n.

In embodiments, the data transmitter 100 may comprise a transmission unit (transmitter) 102 configured to transmit the data 120. The transmission unit 102 may be connected to an antenna 104 of the data transmitter 100. The data transmitter 100 may further comprise a reception unit (receiver) 106 configured to receive data. The reception unit may be connected to the antenna 104 or a further (separate) antenna of the data transmitter 100. The data transmitter 100 may also comprise a combined transmission/reception unit (transceiver).

The data receiver 110 may comprise a reception unit (receiver) 116 configured to receive the data 120. The reception unit 116 may be connected to an antenna 114 of the data receiver 110. Furthermore, the data receiver 110 may comprise a transmission unit (transmitter) 112 configured to transmit data. The transmission unit 112 may be connected to the antenna 114 or to a further (separate) antenna of the data receiver 110. The data receiver 110 may also comprise a combined transmission/reception unit (transceiver).

In embodiments, the data transmitter 100 may be a sensor node, while the data receiver 110 may be a base station. Obviously, it is also possible for the data transmitter 100 to be a base station, while the data receiver 110 is a sensor node. Furthermore, it is possible that the data transmitter 100 and the data receiver 110 are sensor nodes. In addition, it is possible that the data transmitter 100 and the data receiver 110 are base stations.

In the following, detailed embodiments of the transfer method proposed on the basis of FIG. 1 are explained in more detail, which may be performed by the data transmitter 100 and the data receiver 110.

Embodiments enable a transfer of data packets having different lengths with a telemetry system.

In embodiments, instead of adapting the number of hops (the number of sub-data packets), the length of the hops (the length of the sub-data packets) is adapted with respected to the amount of data.

Adapting the number of hops with respect to the amount of data has the disadvantage that additional signaling information (e.g. in the form of preambles) have to be inserted into the extension sequence. This increases the transfer duration of the telegram in the channel and therefore provides a higher susceptibility to interference. In addition, with additional hops, a preamble is additionally needed. A further disadvantage is created by the variable number of partial packets. If partial packets are attached to the telegram, the transfer duration and therefore also the latency in the transfer increase. This is particularly a problem in time-critical applications.

In contrast, in embodiments, the telegram splitting method is used and the lengths of the partial packets (sub-data packets) 142_1 to 142_n are varied without obtaining a superimposition of the partial packets 142_1 to 142_n. If the lengths of the partial packets in classical systems with frequency hopping varied, a temporal superimposition of the individual partial packets would occur.

First Detailed Embodiment

The data 120 of a telegram may be transferred distributed to several hops (sub-data packets) 142_1 to 142_n (see DE 10 2011 082 098 B4). In traditional hopping systems, the partial packets are transferred in a joint manner; however, in the telegram splitting method, there is more space for further data in front of and behind the respective partial packets 142_1 to 142_n.

In embodiments, instead of varying the number of partial packets, the length of the partial packets 142_1 to 142_n is varied. This means that if there is little data 120, the number of the symbols (also referred to as the length) in the partial packets 142_1 to 142_n is lower than in the case when there is more data.

Figure 2:
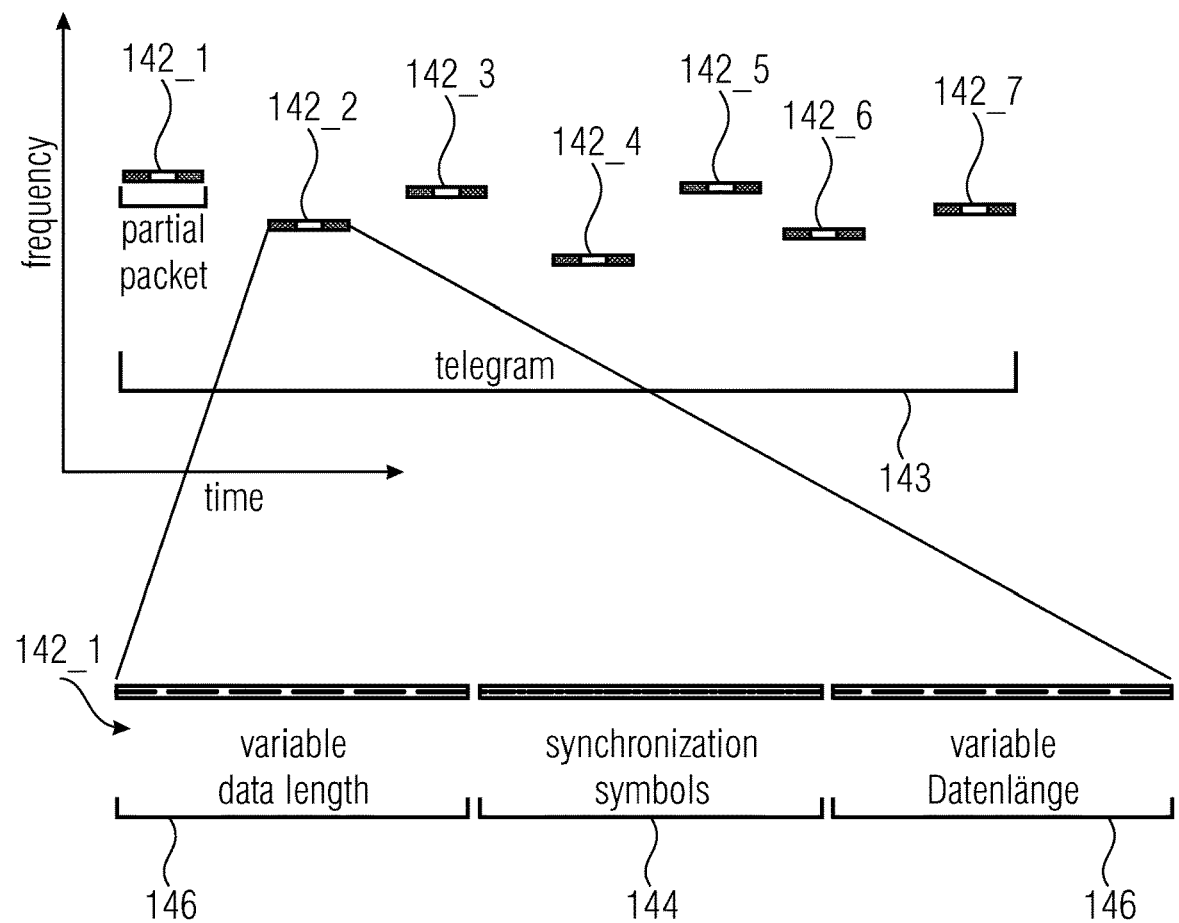
FIG. 2 shows in a diagram an occupancy of a transfer channel during the transfer of the data of variable length using a fixedly specified number of sub-data packets within a fixedly specified time interval.

FIG. 2 shows in a diagram an occupancy of a transfer channel during the transfer of the data 120 of variable length using a fixedly specified number of sub-data packets 142_1 to 142_7 within a fixedly specified time interval 143. In this case, the ordinate describes the frequency and the abscissa describes the time.

As can be seen in FIG. 2, the data 120 of variable length may be distributed to n=7 sub-data packets 142_1 to 142_7 (regardless of its length). The sub-data packets 142_1 to 142_7 are transferred within the fixedly specified time interval 143 distributed in time and in frequency (i.e. using a time/frequency hopping pattern) so that there are transmission pauses between the sub-data packets 142_1 to 142_7.

The sub-data packets 142_1 to 142_7 may be provided with synchronization sequences or partial synchronization sequences. If the sub-data packets 142_1 to 142_7 are provided with synchronization sequences, a full synchronization of the respective sub-data packets and/or a detection or localization of the same in a reception data stream is possible on the receiver side based on the respective synchronization sequence. If the sub-data packets 142_1 to 142_7 are provided with partial synchronization sequences, a full synchronization of the sub-data packets and/or a detection of the same in a reception data stream is (only) possible on the receiver side across several or all partial synchronization sequences into which the synchronization sequence is divided.

In other words, FIG. 2 shows a structure of a telegram with variable partial packet lengths. Here, a midamble (a synchronization sequence or partial synchronization sequence arranged in the center of the sub-data packet) 144 is employed for the synchronization and the data 146 is attached on the right (or in front of) and on the left (or behind) the same. The length of the data blocks varies according to the amount of data to be transferred.

Instead of a midamble, the synchronization sequence may be inserted at any location in the partial packet 142_1 to 142_n and may even be split into several sequences.

Figure 3:
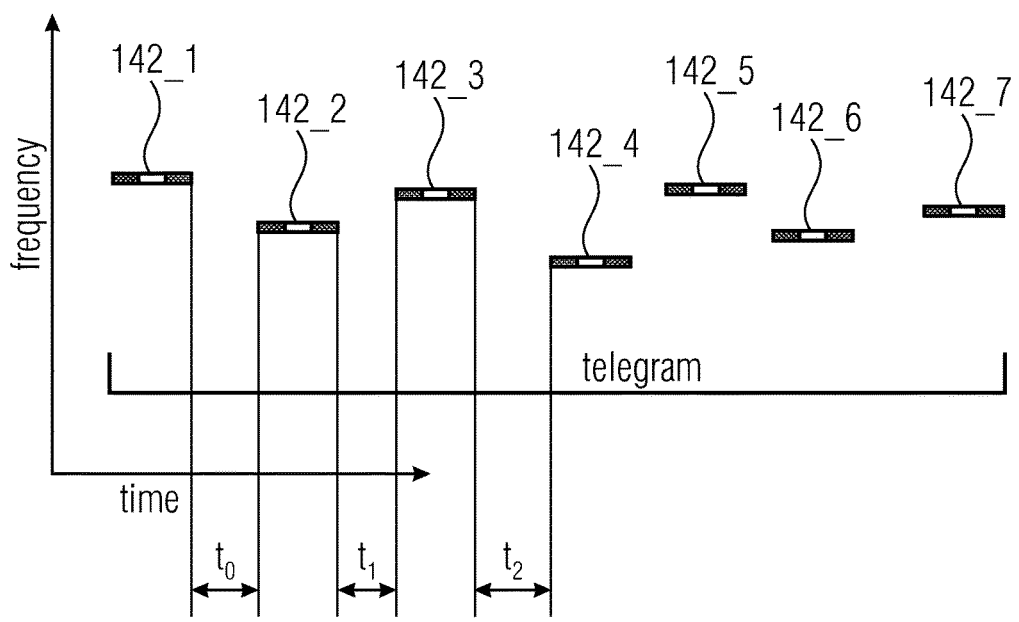
FIG. 3 shows in a diagram an occupancy of a transfer channel during the transfer of data using a plurality of sub-data packets with transmission pauses specifying the temporal distances between the sub-data packets.

In current systems, the distances between the partial packets are determined by pauses (no transfer) between the partial packets. This scheme can be seen in FIG. 3. In detail, FIG. 3 shows in a diagram an occupancy of a transfer channel during the transfer of data using a multitude of sub-data packets 142_1 to 142_7 with transmission pauses that specify the temporal distances $t_0$, $t_1$ and $t_2$ between the sub-data packets 142_1 to 142_7. In this case, the ordinate describes the frequency and the abscissa describes the time. In other words, FIG. 3 shows a definition of the hopping pattern by means of the pauses between the partial packets 142_1 to 142_7. It can be seen that the distances between the partial packets 142_1 to 142_7 are defined by the end of the previous partial packet up to the beginning of the next partial packet. If these pauses are constant for different lengths, the distances of the synchronization sequences vary with respect to each other. In order for the receiver to correctly detect the data, it needs in advance the information as to which length the partial packets 142_1 to 142_7 have, or all possibilities are tried in the receiver until the correct length or the distance between the synchronization sequences is found.

In embodiments, the number n of the partial packets 142_1 to 142_n may be equal for several lengths of the data to be transmitted (on the receiver side or waveform side). The length of the partial packets 142_1 to 142_n varies with the amount of data to be transferred.

In embodiments, the number of the received symbols in the decoder may vary according to the telegram length (on the receiver side or decoder side). If it is unknown, the decoder may evaluate all possible lengths as to the probability that it was transferred.

Second Detailed Embodiment

In the previous detailed embodiment, it is possible to keep the pauses between the partial packets constant (cf. FIG. 3).

This means that the pauses are specified regardless of the partial packet lengths since, as per definition, the end of the previous partial packet up to the beginning of the next partial packet has been specified. However, this may also have the disadvantage that the distances between the synchronization sequences are no longer constant for different telegram lengths, resulting in several detections having to be performed for the different distances.

If the distances between the synchronization sequences are kept constant across the different telegram lengths, it is possible to perform all lengths with only one single synchronization. Therefore, the pauses between the partial packets decrease accordingly if the length of the payload data per telegram increases.

This has the advantage that already existing receivers can continue to use the same detection algorithms and that only the decoder has to be adapted as to the variable telegram lengths.

Figure 4:
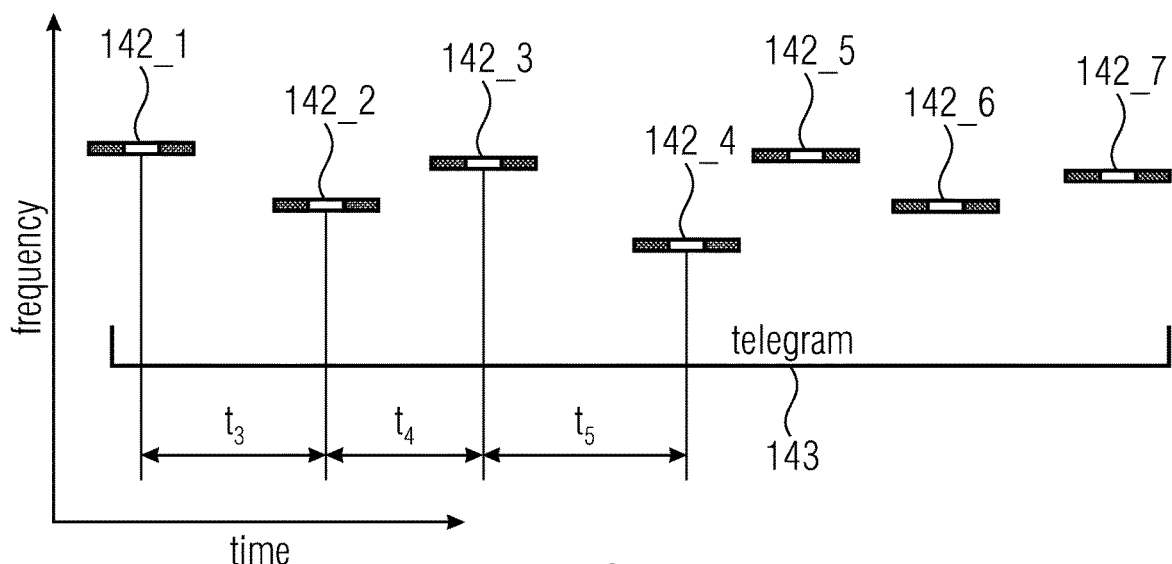
FIG. 4 shows in a diagram an occupancy of a transfer channel during the transfer of the data of variable length using a fixedly specified number of sub-data packets within a fixedly specified time interval, wherein distances between the synchronization sequences and/or sub-synchronization sequences are constant.

FIG. 4 shows in a diagram an occupancy of a transfer channel during the transfer of the data 120 of variable length using a fixedly specified number of sub-data packets 142_1 to 142_7 within a fixedly specified time interval 143, wherein distances $t_3$, $t_4$ and $t_5$ are constant between the synchronization sequences or partial synchronization sequences. In this case, the ordinate describes the frequency and the abscissa describes the time.

In other words, FIG. 4 shows a definition of the hopping pattern by means of the distances of the synchronization sequences between the partial packets.

In embodiments, the number n of the partial packets 142_1 to 142_n may be the same for different lengths of data to be transferred (on the receiver side or waveform side). The pauses between the partial packets may change with the telegram length, while the distances of the synchronization sequences (of the partial packets 142_1 to 142_n) remain the same.

In embodiments (on the receiver side or decoder side), the synchronization may be carried out together for all telegram lengths. For the detection, it is not required to know the transferred telegram length.

Third Detailed Embodiment

In embodiments, the telegram may be divided into a core sequence and an extension sequence. In this case, the core sequence represents the minimal length of the telegram, which therefore has to be transferred.

Through dividing the telegram into a core sequence and an extension sequence it is possible for the receiver to decode a part of the information in advance, before the complete telegram has been transferred.

Figure 5:
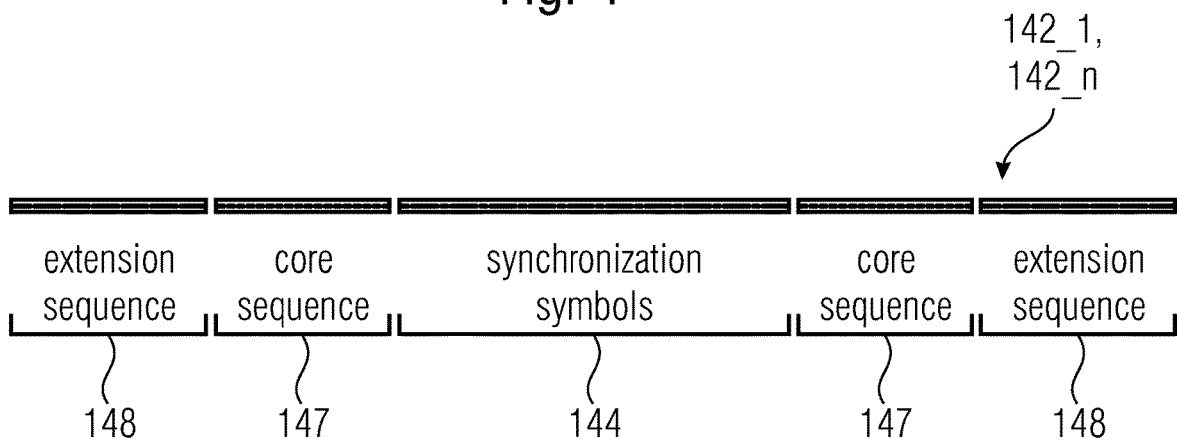
FIG. 5 shows a schematic view of a structure of the sub-data packets with one synchronization sequence, one core sequence and one extension sequence each.

FIG. 5 shows a schematic view of a structure of the sub-data packets 142_1 to 142_n with one synchronization sequence, one core sequence and one extension sequence each. As can be seen in FIG. 5, the core sequence 147 may be arranged (directly) adjacent to the synchronization sequence 144 in the respective sub-data packets 142_1 to 142_n. Furthermore, the extension sequence 148 may be arranged (directly) adjacent to the core sequence 147 in the respective sub-data packets 142_1 to 142_n. For example, a first part of the core sequence may be arranged in front of the synchronization sequence, while a second part of the core sequence may be arranged behind the synchronization sequence. The first part of the core sequence and the second part of the core sequence may have the same length. A first part of the extension sequence may be arranged in front of the first part of the core sequence, while a second part of the extension sequence may be arranged after the second part of the core sequence. The first part of the extension sequence and the second part of the extension sequence may have the same length. The synchronization sequence may be arranged in the center of the respective sub-data packet 142_1 to 142_n.

In other words, FIG. 5 shows a structure of a sub-packet (or partial packet) 142_1 to 142_n with a core sequence and an extension sequence. It can be seen that the symbols of the core are arranged closest to the synchronization symbols. With this, it is possible to decode the core regardless of the extension. Therefore, the length of the extension does not have to be known.

This also has the large advantage that the size of the core may be set to a previously existing length of an existing system. Therefore, the synchronization and decoding of the existing system may be continued to be used, and only a further decoder for the extension has to be added.

In embodiments (on the transmitter side or waveform side), a telegram may be divided into a core and an extension. However, in contrast to DE 10 2011 082 098 B4, this is performed with a constant number of partial packets through the variation of their lengths.

In embodiments (on the receiver side or the decoder side), decoding may be carried out in two separate steps after the detection. For example, the synchronization sequence may be used for decoding the core sequence, while a re-encoded core sequence may be used for decoding the extension sequence.

Fourth Detailed Embodiment

Through dividing the telegram into a core and the extension arises the possibility of decoding the core separately from the extension. Therefore, for example, the length of the entire telegram may not only be signaled in advance but directly in the core of the transfer telegram.

In this case, the essential information for regaining the length information is selectively introduced into the core in the transmitter. First, the receiver decodes the core and may infer therefrom the length of the entire telegram. If this length is known, the data needed accordingly may be loaded, e.g. from a buffer, and decoding the extension may be carried out.

If an error correction (e.g. FEC (Forward Error Correction)) is used for transferring symbols, it may either be split into two independent parts, or an overall coding of the telegram is performed.

However, in the second case, there has to be the possibility of partially decoding the length information in advance.

If the receiver knows the telegram length in advance or if it is achieved by testing all possibilities, any payload data may be inserted into the core. A combination of length information and further data is also possible.

The length of the core symbols may be selected to be arbitrarily large, however, it should not be selected to be substantially larger than the minimal telegram length to be expected so as to avoid the transfer of unnecessary additional data. This is relevant if fewer data is present than needed for the core.

In addition to the signaling of the length information, further parameters may be inserted into the core, which the receiver may use for decoding.

In embodiments (on the transmitter side or waveform side), length information and/or further signaling information may be introduced into the core.

In embodiments (on the receiver side or decoder side), decoding may be performed in two separate steps after detection, wherein part of the information gained from the core is used for decoding the extension.

Fifth Detailed Embodiment

As shown in the previous detailed embodiments, the data may be attached towards the outside starting from the synchronization sequence 144. The more data present, the larger the lengths of the partial packets (sub-data packets) 142_1 to 142_n. This may result in the disadvantage that the error probability of the symbols linearly increases with an increasing distance to the synchronization sequence 144 through estimation errors. This means that symbols that are more distant to the synchronization sequence 114 are usually more often incorrect due to estimation errors in the receiver than symbols that are closer (in the respective sub-data packet 142_1 to 142_n) to the synchronization sequence 144.

In order to avoid this problem, iterative decoding may be employed, wherein the symbols near to the synchronization sequence 144 are first decoded. They are again computed by means of re-encoding and may therefore also be used for the estimation in the receiver. Because of this, a longer synchronization sequence is provided, using which the parameters may be better estimated. This step may be repeated until the entire telegram has been received.

Figure 6:
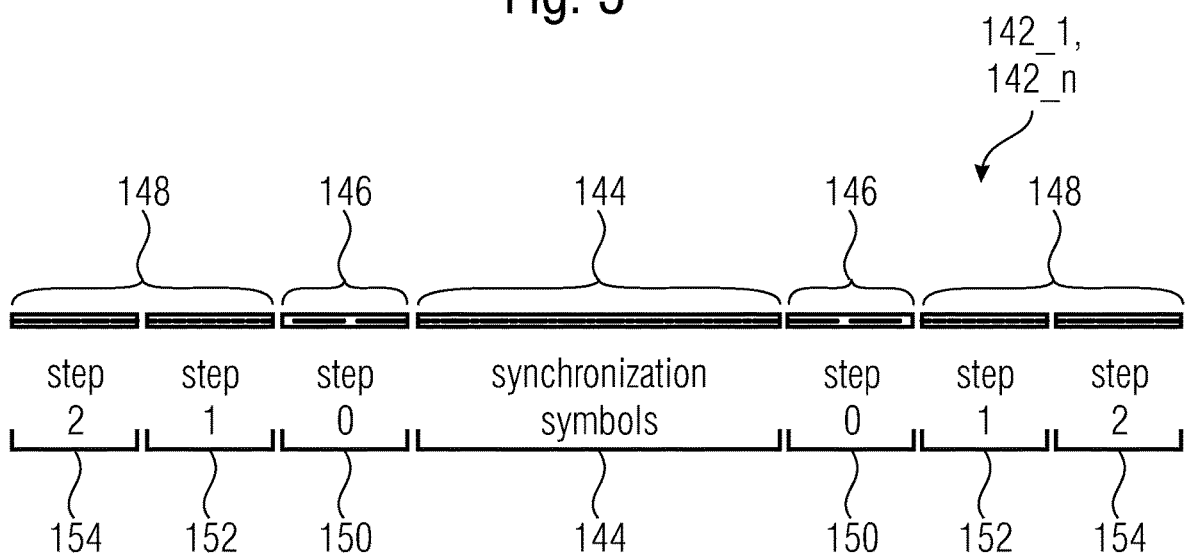
FIG. 6 shows a schematic view of a structure of the sub-data packets with one synchronization sequence, one core sequence and one extension sequence each, together with a decoder-side division of the respective sub-data packet according to the sequences for iterative decoding.

FIG. 6 shows a schematic view of a structure of the sub-data packets 142_1 to 142_n with one synchronization sequence 144, one core sequence 147 and one extension sequence 148 each, together with a decoder-side division of the respective sub-data packet according to the sequences for iterative decoding. The structure of the sub-data packet shown in FIG. 6 corresponds to the structure of the sub-data packet shown in FIG. 5.

As is indicated in FIG. 6, the core sequence 147 may be decoded in a zeroth step 150 using the synchronization sequence 144. In a first step 152, the decoded core sequence (or at least a part of the decoded core sequence) may be re-encoded in order to obtain the re-encoded core sequence, and a first part of the extension sequence 148 may be decoded by using the re-encoded core sequence. In a second step 154, the decoded first part of the extension sequence (or at least a part thereof) may be re-encoded in order to obtain a re-encoded first part of the extension sequence, and a second part of the extension sequence 148 may be decoded using the re-encoded first part of the extension sequence.

In other words, FIG. 6 shows iterative decoding using the example of a partial packet (sub-data packet). Here, the core 147 may be decoded in step 0. If its data is present, re-encoding may be performed, and the synchronization sequence 144 increases by the two parts of step 0 for the estimation. Then, the estimation may again be performed, and the data of step 1 may be decoded. Similarly, this may also be performed for step 2.

Figure 7:
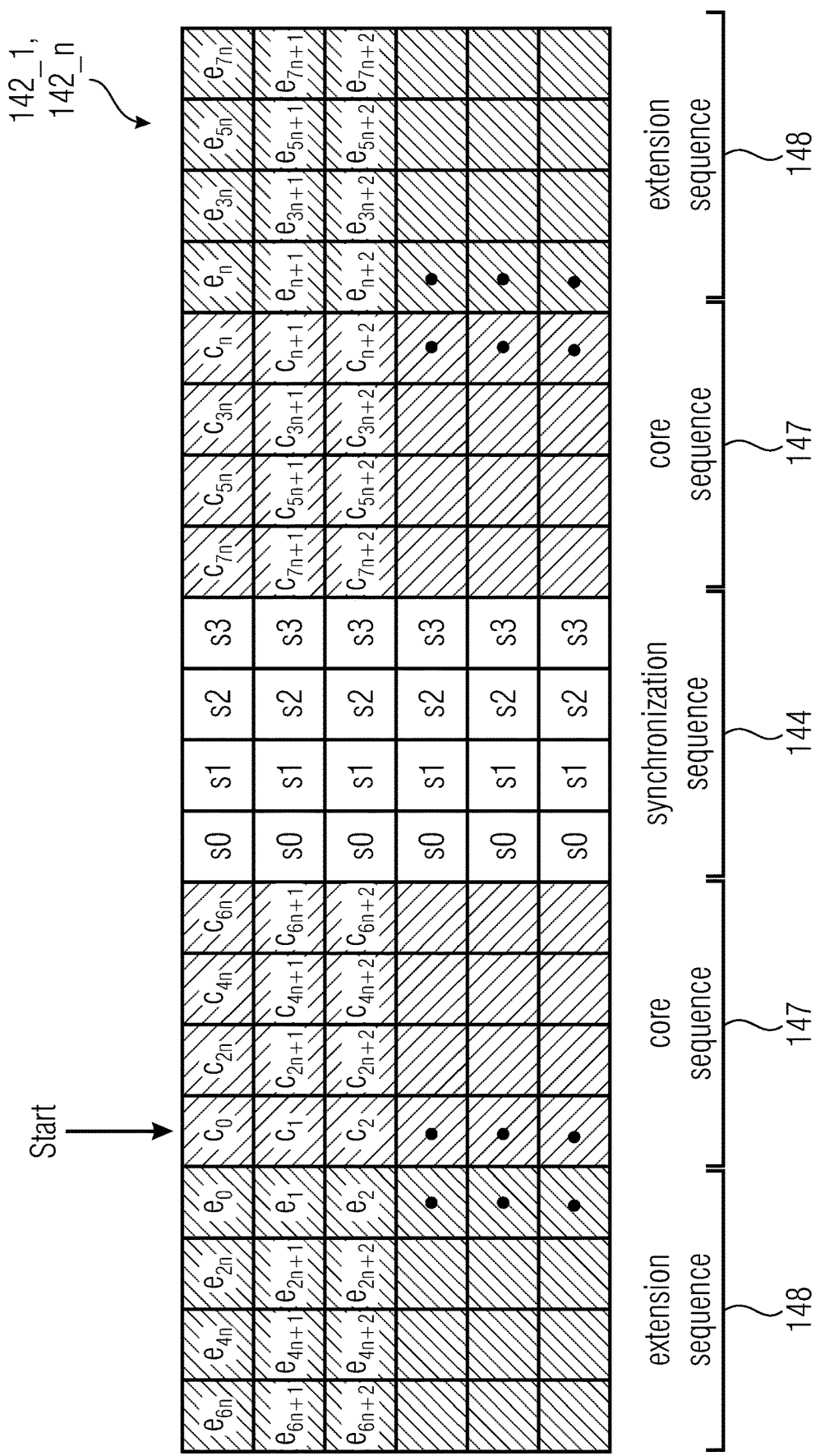
FIG. 7 shows a schematic view of a structure of the sub-data packets with one synchronization sequence, one core sequence and one extension sequence each, wherein the data is arranged according to the core sequence and the extension sequence in the respective sub-data packets such that a distance of the coded data is increased with respect to an influence length of a code used for coding the data.

For this type of iterative decoding to be possible, the interleaver (means for interleaving data) may fulfil this requirement. However, there are also different possibilities for implementation. It is to be noted that the data for each decoder step is attached further towards the outside (away from the synchronization sequence 144). FIG. 7 shows an example of such an interleaver.

In detail, FIG. 7 shows a schematic view of a structure of the sub-data packets 142_1 to 142_n with one synchronization sequence 144, one core sequence 147 and one extension sequence 148 each, wherein the data is arranged according to the core sequence 147 and the extension sequence 148 in the respective sub-data packets 142_1 to 142_n such that a distance of the coded data is increased (or maximized) with respect to an influence length of a code used for coding the data.

In other words, FIG. 7 shows an example of an interleaver for iterative decoding. In this case, decoding is performed in an iterative manner in two steps: the core is decoded first, and the extension is subsequently decoded.

In embodiments (on the transmitter side or waveform side), the interleaver design may be selected such that iterative decoding is possible. Encoding the telegram may be performed out such that early partial decoding with only part of the data is possible.

In embodiments (on the receiver side or decoder side), the decoder may decode part of the message (or the sub-data packet) and use the gained information for a renewed estimation of frequency, phase and/or time.

Sixth Detailed Embodiment

Due to a specified latency requirement for the system, the pauses between the partial packets (sub-data packets) 142_1 to 142_n may not exceed a maximum length in order to be able to transfer all partial packets 142_1 to 142_n within the requirement (within the fixedly specified time interval 143). This means that the distances between the partial packets 142_1 to 142_n may not become arbitrarily large.

By using quartzes, which have a tolerance, the entire telegram may be transferred in a certain duration since the symbols times in relation to the detection time may no longer be adhered to. This time span in which the entire telegram has to be transferred is called coherence time. Due to this effect, the duration of the pauses between the partial packets has to be limited.

With a minimally defined distance between two synchronization sequences of successive partial packets 142_1 to 142_n, there is a maximum size that the partial packets 142_1 to 142_n may not exceed, which is reached exactly when the pause is completely filled with symbols of the two partial packets.

In practice, however, it is better to define the maximum size to be smaller so that a pause is still adhered to between the partial packets 142_1 to 142_n in order to become more robust against interferences and, in some circumstances, to be able to reload the energy storage.

In order to not limit the maximum size of the telegram by limiting the duration of the pauses, the telegram may be divided into so-called blocks. This means that, if the above mentioned maximum length of the partial packets is reached, the signal is split into at least two blocks. This scheme may be seen in FIG. 8.

Figure 8:
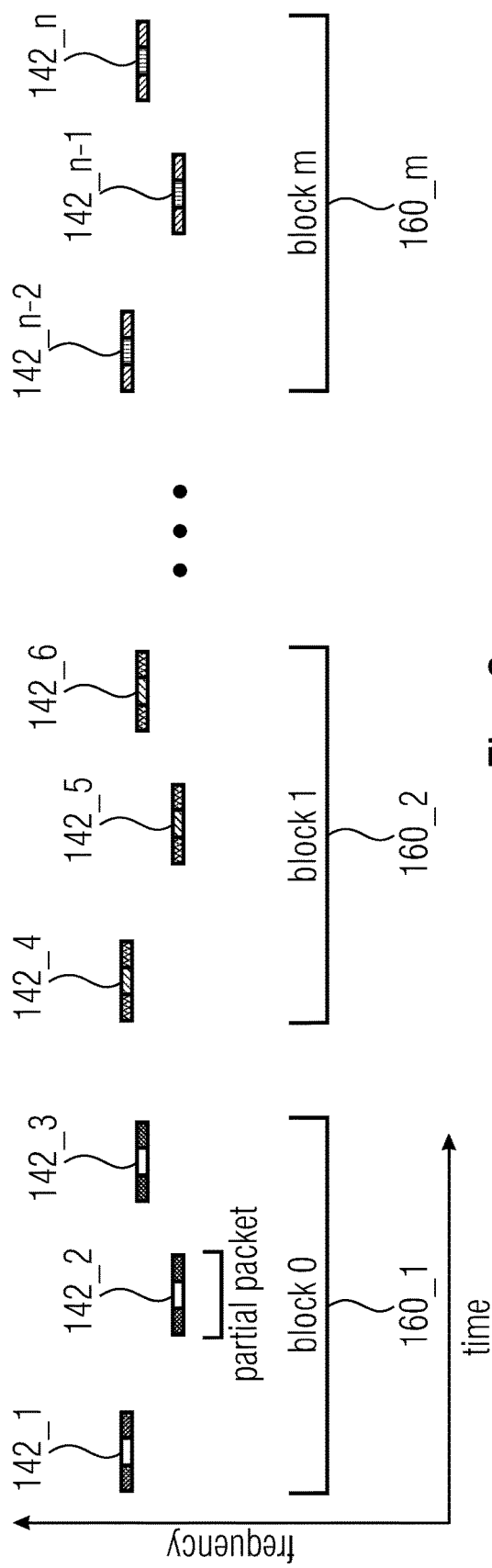
FIG. 8 shows in a diagram an occupancy of a transfer channel during the transfer data using a plurality of sub-data packets combined into blocks.

In detail, FIG. 8 shows in a diagram an occupancy of a transfer channel during the transfer of data by using a plurality of sub-data packets 142_1 to 142_n combined into blocks 160_1 to 160_m. In this case, the ordinate describes the frequency and the abscissa describes the time.

In this case, the sub-data packets 142_1 to 142_n may be (evenly) distributed to m blocks 160_1 to 160_m so that each of the blocks 160_1 to 160_m comprises at least two sub-data packets.

As can be seen in FIG. 8, the sub-data packets 142_1 to 142_n may be combined into blocks 160_1 to 160_m of three sub-data packets each so that a first block 160_1 comprises the sub-data packets 142_1 to 142_3, a second block 160_2 comprises the sub-data packets 142_4 to 142_6, and a m-th block **160_*m* comprises the sub-data packets 142_*n*-2 to 142_*n***.

In other words, FIG. 8 shows a division of a telegram into several blocks 160_1 to **160_*m*. In this case, the number, the length, the synchronization sequences and also the hopping pattern in each block 160_1 to 160_*m*** may be selected arbitrarily and regardless of the above, as long as it is known to the receiver.

A big advantage of dividing the telegram into blocks 160_1 to **160_*m* is the increased coherence time since the blocks 160_1 to 160_*m*** may be individually detected.

With this, the synchronization time which runs off due to quartz offsets may be recalculated after each block and may be accordingly trailed.

If an error correction is used, it is possible to compute the coding either across the entire telegram or to consider the coding for each block 160_1 to **160_*m* separately. The latter has the advantage that a part of the telegram may be decoded early. If there is an error during this early decoding and the transmitted data cannot be reconstructed, the reception of the further blocks 160_1 to 160_*m*** may be cancelled and the power consumption may therefore be reduced.

In embodiments (on the transmitter side or waveform side), a telegram may be split into at least two independent blocks 160_1 to **160_*m* which may be individually detected. In this case, the number of partial blocks 142_1 to 142_*n* of the blocks 160_1 to 160_*m* may be different, the length between the blocks 160_1 to 160_*m*** may vary and the hopping pattern may also be independent of each other.

In embodiments (on the receiver side or decoder side), further blocks may be decoded after the detection of a first block and the reception data may be combined from both blocks. The receiver may have the possibility to individually synchronize each block anew.

Seventh Detailed Embodiment

It is also possible to signal in the first or previous block the number and size of the upcoming blocks, thus, a flexible telegram length is here also possible. The distances and the hopping pattern with respect to the following blocks may also be signaled. If a pseudo-random pattern is to be generated, e.g. a part of the transfer data (e.g. CRC (Cyclic Redundancy Check) or unknown payload data)) may be derived from the previous block for generating the distances, hopping patterns, synchronization sequence and further transfer parameters.

In embodiments (on the transmitter side or waveform side), a signaling of a number, a size, a hopping pattern, etc. may be carried out in the first or previous block.

In embodiments (on the receiver side or decoder side), the decoding of the entire telegram may be carried out in steps after a part of the already decoded information is used for signaling the following blocks.

Eighth Detailed Embodiment

Instead of the division into blocks 160_1 to **160_*m***, it is also possible to add individual partial packets (sub-data packets) to the telegram in order to further increase the maximum length of the telegram. This method is described in more detail in DE 10 2011 082 098 B4.

However, the method described therein has the disadvantage that the lengths of the partial packets could not be varied. With the method described herein, a combination of variable partial packet lengths and their number may now be realized.

A combination of the blocks described in the sixth detailed embodiment and the insertion of individual partial packets is also possible. This results in a higher amount of flexibility. For example, if only little data is needed above the maximum size of a block, it makes sense to add individual partial packets to the telegram. However, if more data is attached, it is better to generate a new block since the coherence time is increased.

Similarly to the seventh detailed embodiment, it is also possible to signal upcoming partial packets in previous data. This may be the number, the length, the hopping pattern or further transfer parameters.

Figure 9:
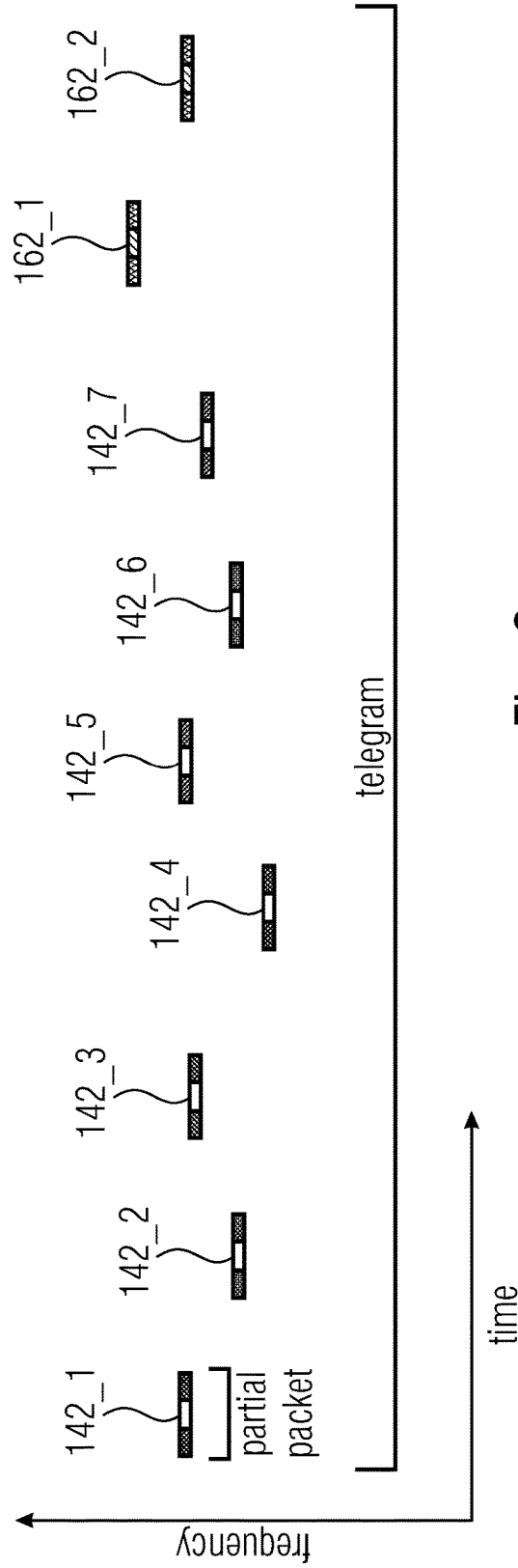
FIG. 9 shows in a diagram an occupancy of a transfer channel during the transfer of the data of variable length using a specified number of sub-data packets, wherein the specified number of sub-data packets is followed by additional sub-data packets.

FIG. 9 shows in a diagram an occupancy of a transfer channel during the transfer of the data 120 of variable length using a specified number of sub-data packets 142_1 to 142_7, wherein additional sub-data packets 162_1 and 162_2 are attached to the specified number of sub-data packets 142_1 to 142_7.

The data 120 of variable length may be distributed to further sub-data packets 162_1 and 162_2 when exceeding a maximum admissible length which would result in, when transferring the data 120 of variable length within the specified time interval, not reaching a temporally defined minimum distance between the sub-data packets 142_1 to 142_7 or even an overlap of the sub-data packets 142_1 to 142_7.

In other words, FIG. 9 shows a structure of a telegram with a variable number of partial packets.

In embodiments (on the transmitter side or waveform side), the number of the partial packets used may not be constant and the lengths of the partial packets may additionally vary. In embodiments (on the receiver side or decoder side), further partial packets that may not be individually decoded may be received after detection of a first block. The hopping pattern of these partial packets may be defined or may be transferred.

Further Embodiments

Figure 10:
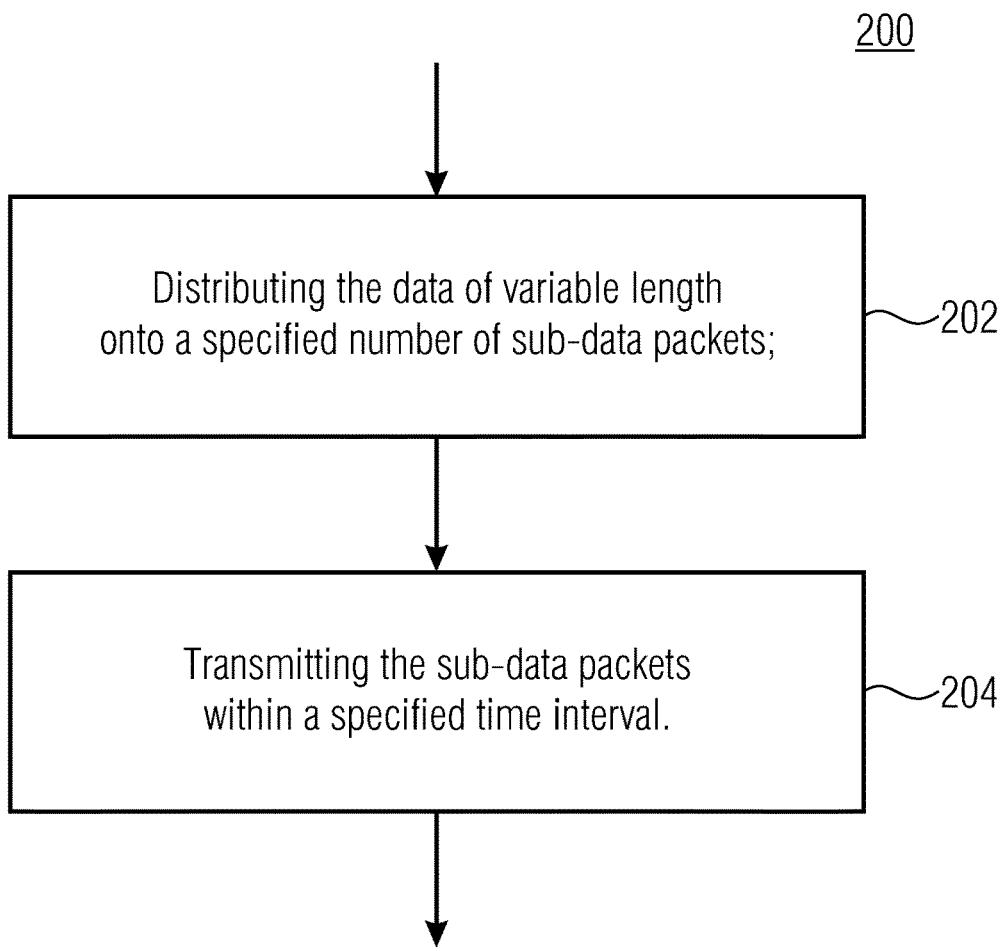
FIG. 10 shows a flow diagram of a method for transmitting data of variable length according to an embodiment.

FIG. 10 shows a flow diagram of a method 200 for transmitting data of variable length. The method 200 includes a step 202 of distributing the data of variable length to a specified number of sub-data packets and a step 204 of transmitting the sub-data packets.

Figure 11:
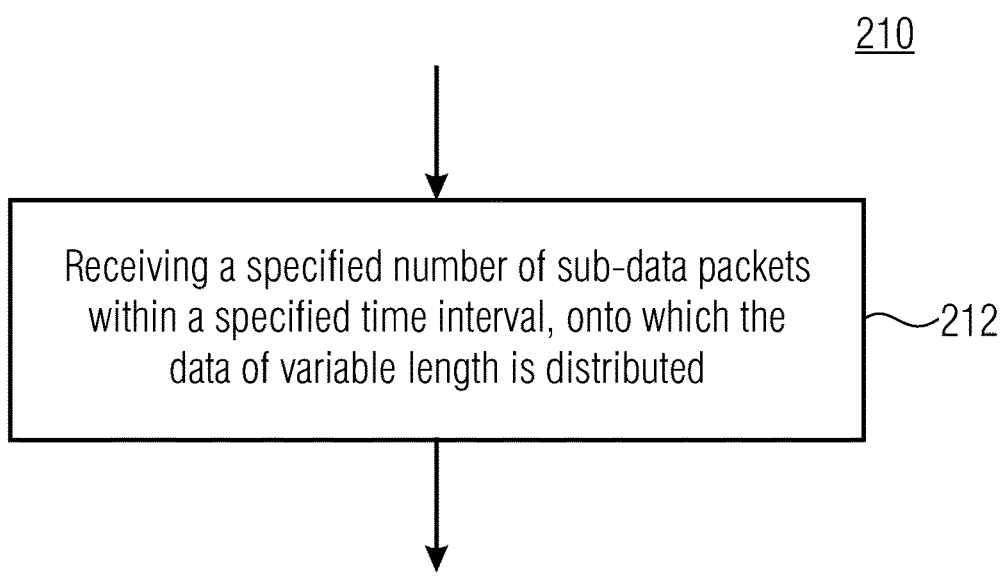
FIG. 11 shows a flow diagram of a method for receiving data of variable length according to an embodiment.

FIG. 11 shows a flow diagram of a method 210 for receiving data of variable length. The method 210 includes a step 212 of receiving a specified number of sub-data packets to which the data of variable length is distributed.

In embodiments, partial packet lengths may vary with an invariable number of partial packets.

In embodiments, iterative decoding may be carried out for gaining the length information.

In embodiments, splitting a telegram into blocks with a separate decoding, if applicable, may be carried out.

Embodiments provide a system for transferring data from many sensor nodes to a base station. However, the concepts described herein may be used for any transfer if the channel is not coordinated (ALOHA or slotted-ALOHA access method) and the receiver does therefore not know when a packet is transferred. In addition, overlaps with other participants may arise due to this, leading to interferences during the transfer.

The radio transfer band used does not have to be exclusively reserved for this transfer. The frequency resource may be shared with many further systems, which makes a reliant transfer of the information more difficult.

In embodiments, payload data of different length may be transferred in a telegram. In this case, the telegram splitting method may be used, by which it is possible to vary the lengths of the partial packets, not requiring any additional signaling information.

In embodiments, the estimation accuracy may be increased for longer partial packets by iterative decoding.

In embodiments, a telegram may be split into several independent blocks. With this, the maximum amount of data to be transferred may further be increased.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A data transmitter for transmitting data of variable length, wherein the data transmitter is configured to distribute the data of variable length to a specified number of sub-data packets and to transmit the sub-data packets;
   wherein the data of variable length comprises payload data;
   wherein a number of symbols of the individual sub-data packets depends on a length of the data of variable length,
   wherein a temporal distance between synchronization sequences of immediately subsequent sub-data packets is constant regardless of a length of the data of variable length.

2. The data transmitter according to claim 1, wherein the data transmitter is configured to distribute the data of variable length regardless of its length always to the same number of sub-data packets.

3. The data transmitter according to claim 1, wherein the data transmitter is configured to transmit the sub-data packets with a temporal distance depending on the length of the data of variable length so that a temporal distance between specified regions of the sub-data packets is constant regardless of a length of the data of variable length.

4. The data transmitter according to claim 1, wherein the data transmitter is configured to provide at least a part of the sub-data packets with synchronization sequences.

5. The data transmitter according to claim 1, wherein the data transmitter is configured to provide at least a part of the sub-data packets with sub-synchronization sequences.

6. The data transmitter according to claim 5, wherein the data transmitter is configured to transmit the sub-data packets with a temporal distance depending on the length of the data of variable length so that a temporal distance between the synchronization sequences of the sub-data packets is constant regardless of a length of the data of variable length.

7. The data transmitter according to claim 1, wherein the data comprises core data and extension data, wherein the core data comprises a fixed length and the extension data comprises a variable length.

8. The data transmitter according to claim 7, wherein the data transmitter is configured to provide the core data with signaling information for signaling the length of the extension data.

9. The data transmitter according to claim 7, wherein the data transmitter is configured to distribute the core data to the sub-data packets such that the respective part of the core data is arranged adjacent to the (sub-)synchronization sequences in the sub-data packets.

10. The data transmitter according to claim 9, wherein the data transmitter is configured to distribute the core data to the sub-data packets such that the respective part of the core data is arranged evenly in front of and behind the respective (sub-)synchronization sequences in the sub-data packets.

11. The data transmitter according to claim 9, wherein the data transmitter is configured to distribute the extension data to the sub-data packets such that the respective part of the extension data is arranged adjacent to the respective part of the core data in the sub-data packets.

12. The data transmitter according to claim 11, wherein the data transmitter is configured to distribute the extension data to the sub-data packets such that the respective part of the extension data is evenly arranged in front of and behind the respective part of the core data in the sub-data packets.

13. The data transmitter according to claim 1, wherein the data transmitter is configured to divide the number of sub-data packets into at least two independent blocks of sub-data packets;
    wherein the data transmitter is configured to divide the sub-data packets in such a way into the at least two blocks of sub-data packets that a first block of the at least two blocks of sub-data packets may be individually detected on the receiver side.

14. The data transmitter according to claim 13, wherein the data transmitter is configured to provide the first block of sub-data packets with information about a second block of sub-data packets of the at least two blocks of sub-data packets.

15. The data transmitter according to claim 14, wherein the information signals at least one of a length, a number of sub-data packets and a hopping pattern with which the sub-data packets are transmitted.

16. A data receiver for receiving data of variable length, wherein the data receiver is configured to receive a specified number of sub-data packets to which the data of variable length is distributed;
    wherein the data of variable length comprises payload data;
    wherein a number of symbols of the individual sub-data packets depends on a length of the data of variable length;
    wherein a temporal distance between synchronization sequences of immediately subsequent sub-data packets is constant regardless of a length of the data of variable length.

17. The data receiver according to claim 16, wherein the data of variable length regardless of its length is always distributed to an equal number of sub-data packets.

18. The data receiver according to claim 16, wherein at least a part of the sub-data packets is provided with synchronization sequences;
    wherein the data receiver is configured to detect the sub-data packets based on the synchronization sequences.

19. The data receiver according to claim 16, wherein at least a part of the sub-data packets is provided with sub-synchronization sequences;
    wherein the data receiver is configured to detect the sub-data packets based on the sub-synchronization sequences.

20. The data receiver according to claim 19, wherein the temporal distance between the sub-synchronization sequences is constant and/or is known to the data receiver.

21. The data receiver according to claim 16, wherein the data of variable length comprises core data and extension data, wherein the core data comprises a fixed length and the extension data comprises a variable length.

22. The data receiver according to claim 21, wherein the core data is provided with signaling information for signaling the length of the extension data;
    wherein the data receiver is configured to receive the extension data using the signaling information, or to extract them from the sub-data packets.

23. The data receiver according to claim 21, wherein the core data is distributed to the sub-data packets such that the respective part of the core data is arranged adjacent to the (sub-)synchronization sequences in the sub-data packets.

24. The data receiver according to claim 23, wherein the core data is distributed to the sub-data packets such that the respective part of the core data is evenly arranged in front of and behind the respective (sub-)synchronization sequence in the sub-data packets.

25. The data receiver according to claim 21, wherein the extension data is distributed to the sub-data packets such that the respective part of the extension data is arranged adjacent to the respective part of the core data in the sub-data packets.

26. The data receiver according to claim 25, wherein the extension data is distributed to the sub-data packets such that the respective part of the extension data is evenly arranged in front of and behind the respective part of the core data in the sub-data packets.

27. The data receiver according to claim 21, wherein the core data is distributed to the sub-data packets depending on lengths of the (sub-) synchronization sequence so that sub-data packets with a longer (sub-) synchronization sequence comprise a larger part of core data than sub-data packets with a shorter (sub-)synchronization sequence;

wherein the data receiver is configured to determine lengths of the parts of core data comprised by the respective sub-data packets based on the length of the (sub-)synchronization sequence comprised by the respective sub-data packets.

28. The data receiver according to claim 21, wherein the extension data is distributed to the sub-data packets depending on lengths of the (sub-) synchronization sequence so that sub-data packets with a longer (sub-) synchronization sequence comprise a larger part of extension data than sub-data packets with a shorter (sub-)synchronization sequence;
  wherein the data receiver is configured to determine lengths of the parts of extension data comprised by the respective sub-data packets based on the lengths of the (sub-) synchronization sequence comprised by the respective sub-data packets.

29. The data receiver according to claim 23,
  wherein the data receiver is configured to decode and re-encode a first region of the respective part of the data of variable length using the (sub-)synchronization sequences in order to acquire a first partial region of re-encoded data;
  wherein the data receiver is configured to decode a second region of the respective part of the data of variable length using the first partial region of re-encoded data.

30. The data receiver according to claim 29, wherein the data receiver is configured to decode the second region of the respective part of the data of variable length using the first partial region of re-encoded data in order to acquire a second partial region of re-encoded data;
  wherein the data receiver is configured to decode a third region of the respective part of the data of variable length using the second partial region of re-encoded data.

31. The data receiver according to claim 29, wherein, in the respective sub-data packets, the first region is arranged directly adjacent to the (sub-) synchronization sequence, and wherein the second region is arranged directly adjacent to the first region.

32. The data receiver according to claim 17, wherein the number of sub-data packets is split into at least two independent blocks of sub-data packets such that a first block of the at least two blocks of sub-data packets may be individually detected;
  wherein the data receiver is configured to individually detect the first block of the at least two blocks of sub-data packets.

33. The data receiver according to claim 32, wherein the first block of sub-data packets of the at least two blocks of sub-data packets is provided with information about a second block of the at least two blocks of sub-data packets;
  wherein the data receiver is configured to receive the second block of the at least two blocks of sub-data packets using the information.

34. A system comprising:
  a data transmitter according to claim 1; and
  a data receiver according to claim 17.

35. A method for transmitting data of variable length, comprising:
  distributing the data of variable length to a specified number of sub-data packets; and
  transmitting the sub-data packets within a specified time interval;
  wherein the data of variable length comprises payload data;
  wherein a number of symbols of the individual sub-data packets depends on a length of the data of variable length;
  wherein a temporal distance between synchronization sequences of immediately subsequent sub-data packets is constant regardless of a length of the data of variable length.

36. A method for receiving data of variable length, comprising:
  receiving a specified number of sub-data packets within a specified time interval, to which the data of variable length is distributed;
  wherein the data of variable length comprises payload data;
  wherein a number of symbols of the individual sub-data packets depends on a length of the data of variable length;
  wherein a temporal distance between synchronization sequences of immediately subsequent sub-data packets is constant regardless of a length of the data of variable length.

37. A non-transitory digital storage medium having a computer program stored thereon to perform the method for transmitting data of variable length, comprising:
  distributing the data of variable length to a specified number of sub-data packets; and
  transmitting the sub-data packets within a specified time interval;
  wherein the data of variable length comprises payload data;
  wherein a number of symbols of the individual sub-data packets depends on a length of the data of variable length;
  wherein a temporal distance between synchronization sequences of immediately subsequent sub-data packets is constant regardless of a length of the data of variable length,
  when said computer program is run by a computer.

38. A non-transitory digital storage medium having a computer program stored thereon to perform the method for receiving data of variable length, comprising:
  receiving a specified number of sub-data packets within a specified time interval, to which the data of variable length is distributed;
  wherein the data of variable length comprises payload data;
  wherein a number of symbols of the individual sub-data packets depends on a length of the data of variable length;
  wherein a temporal distance between synchronization sequences of immediately subsequent sub-data packets is constant regardless of a length of the data of variable length,
  when said computer program is run by a computer.

* * * * *